US011409959B2

(12) United States Patent
Ganu et al.

(10) Patent No.: US 11,409,959 B2
(45) Date of Patent: Aug. 9, 2022

(54) REPRESENTATION LEARNING FOR TAX RULE BOOTSTRAPPING

(71) Applicant: Intuit Inc., Mountain View, CA (US)

(72) Inventors: Hrishikesh Ganu, Banglalore (IN); Mithun Ghosh, Banglalore (IN)

(73) Assignee: Intuit Inc., Mountain View, CA (US)

( * ) Notice: Subject to any disclaimer, the term of this patent is extended or adjusted under 35 U.S.C. 154(b) by 430 days.

(21) Appl. No.: 16/526,785

(22) Filed: Jul. 30, 2019

(65) Prior Publication Data
US 2020/0394263 A1    Dec. 17, 2020

(30) Foreign Application Priority Data

Jun. 14, 2019   (IN) .............................. 201921023587

(51) Int. Cl.
| | | |
|---|---|---|
| *G06F 17/00* | (2019.01) | |
| *G06F 40/284* | (2020.01) | |
| *G06Q 40/00* | (2012.01) | |
| *G06N 20/20* | (2019.01) | |

(52) U.S. Cl.
CPC ........... *G06F 40/284* (2020.01); *G06N 20/20* (2019.01); *G06Q 40/10* (2013.01)

(58) Field of Classification Search
CPC .......... G06N 20/00; G06N 20/20; G06N 3/08; G06N 5/02; G06Q 40/10; G06F 40/284; G06F 40/211
USPC .......................................................... 704/9
See application file for complete search history.

(56) References Cited

U.S. PATENT DOCUMENTS

| | | | |
|---|---|---|---|
| 2017/0083569 A1* | 3/2017 | Boguraev | ............. G06F 16/243 |
| 2020/0285944 A1* | 9/2020 | Lee | ........................... G06N 3/08 |

OTHER PUBLICATIONS

Lau, Jey Han et al., "An Empirical Evaluation of doc2vec with Practical Insights into Document Embedding Generation"; Cornell University: <https://arxiv.org/abs/1607.05368>; Submitted Jul. 19, 2016 (9 pages).
Mikolov, Tomas et al., "Distributed Representations of Words and Phrases and their Compositionality"; Cornell University: <https:arxiv.org/abs/1310.4546>; Submitted Oct. 16, 2013 (9 pages).

(Continued)

*Primary Examiner* — Paul C McCord
(74) *Attorney, Agent, or Firm* — Ferguson Braswell Fraser Kubasta PC

(57) ABSTRACT

A rule having text is pre-processed by replacing terms with dummy tokens. A first machine learning model (MLM) uses the dummy tokens to generate a dependency graph with nodes related by edges tagged with dependency tags. A second MLM uses the dependency graph to generate a canonical version with node labels. The node labels are sorted into a lexicographic order to form a document. A third MLM uses the document to generate a machine readable vector (MRV) that embeds the document as a sequence of numbers representative of a structure of the rule. The MRV is compared to additional MRVs corresponding to additional rules for which computer useable program code blocks have been generated. A set of MRVs is identified that match the MRV within a range. The set of MRVs correspond to a set of rules from the additional rules. The set of rules is displayed to a user.

20 Claims, 5 Drawing Sheets

(56) References Cited

OTHER PUBLICATIONS

Narayanan, Annamalai et al., "graph2vec: Learning Distributed Representations of Graphs"; Cornell University: <https:arxiv.org/abs/1707.05005>; Submitted Jul. 17, 2017 (8 pages).
Shervashidze, Nino et al., "Weisfeiler-Lehman Graph Kernels"; The Journal of Machine Learning Research, vol. 12; <https//jmlr.org/papers/volume12/shervashidze11a/shervashidze11a.pdf>; pp. 2539-2561; Feb. 1, 2011 (13 pages).
Weisfeiler, B. Yu. et al., "The Reduction of a Graph to Canonical Form and the Algebra Which Appears Therein"; <https://iti.zcu.cz/wl2018/pdf/wl_paper_translation pdf>; Jan. 1968 (11 pages).

* cited by examiner

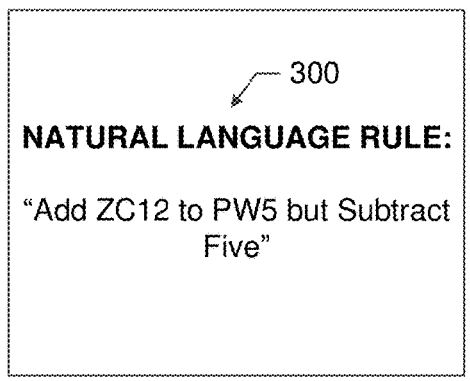
*FIG. 3A*
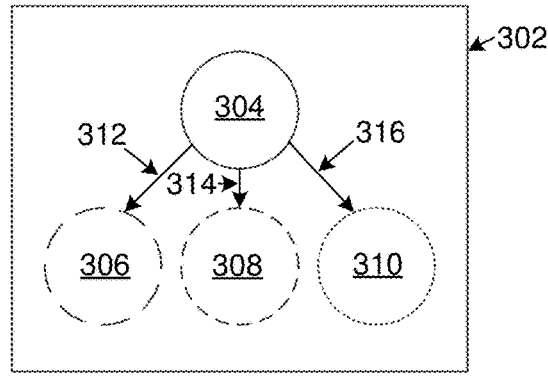
*FIG. 3B*
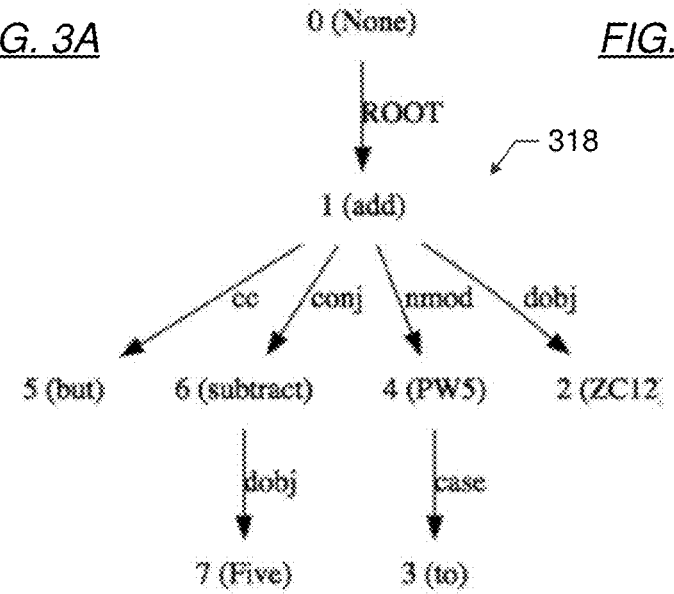
*FIG. 3C*
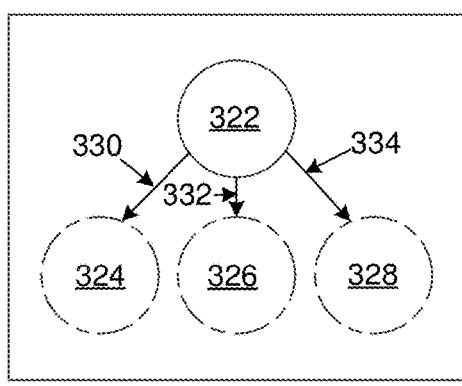
*FIG. 3D*
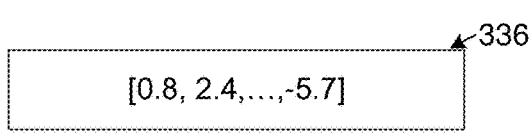
*FIG. 3E*
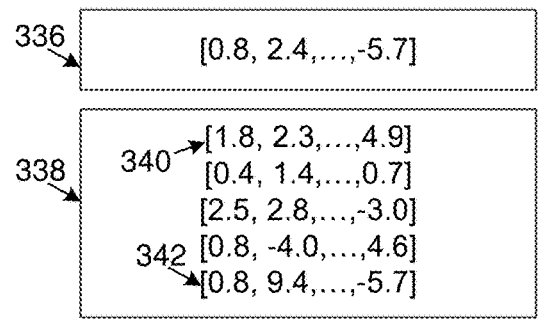
*FIG. 3F*
{Program Code
...similar structure
...adds four numbers
...adds a constant}
*FIG. 3G*

REPRESENTATION LEARNING FOR TAX RULE BOOTSTRAPPING

CROSS-REFERENCE TO RELATED APPLICATIONS

This application claims priority under 35 U.S.C. § 119(a) to Indian patent application 201921023587, filed Jun. 14, 2019, and entitled "REPRESENTATION LEARNING FOR TAX RULE BOOTSTRAPPING", which is incorporated herein by reference in its entirety.

BACKGROUND

Computer programmers are often tasked with converting natural language rules into computer program code. However, when thousands of rules are to be so converted, the task can be challenging.

SUMMARY

In general, in one aspect, one or more embodiments relate to a method. The method includes receiving a rule comprising text and pre-processing the rule by replacing terms in the rule with a plurality of dummy tokens denoting a plurality of entities. The method also includes generating, using a first machine learning model which takes the plurality of dummy tokens as input, a dependency graph comprising a rooted tree having a plurality of nodes related by a plurality of edges that are tagged according to a plurality of dependency tags. The method also includes generating, using a second machine learning model which takes the dependency graph as input, a canonical version of the dependency graph, wherein the canonical version comprises a canonical graph having a plurality of node labels. The method also includes sorting the plurality of node labels into a lexicographic order to form a document. The method also includes generating, using a third machine learning model which takes the document as input, a machine readable vector that embeds the document as a sequence of numbers representative of a structure of the rule. The method also includes comparing the machine-readable vector to a plurality of additional machine readable vectors. The plurality of additional machine readable vectors corresponds to a plurality of additional rules for which a plurality of computer useable program code blocks has been generated. The method also includes identifying a set of machine readable vectors, from the plurality of machine readable vectors, that match the machine readable vector within a range, wherein the set of machine readable vectors correspond to a set of rules from the plurality of additional rules. The method also includes displaying the set of rules to a user.

In general, in another aspect, one or more embodiments relate to a system. The system includes a data repository storing a rule, a plurality of dummy tokens representing a plurality of entities in the rule, a dependency graph comprising a rooted tree having a plurality of nodes related by a plurality of edges tagged according to a plurality of dependency tags, a canonical graph having a plurality of node labels, a document formed from the plurality of node labels, a machine readable vector which embeds the document as a sequence of numbers representative of a structure of the rule, and a plurality of additional machine readable vectors representative of a plurality of structures of a plurality of additional rules. The system also includes a pre-processing engine configured to pre-process the rule by replacing terms in the rule with the plurality of dummy tokens. The system also includes a document generator configured to sort the plurality of node labels into a lexicographic order to form the document. The system also includes a machine learning model execution engine configured to execute: a first machine learning model which receives as input the plurality of dummy tokens and outputs the dependency graph, a second machine learning model which receives as input the dependency graph and outputs the canonical graph, and a third machine learning model which receives as input the document and outputs the machine readable vector. The system also includes a comparator configured to: compare the machine readable vector to the plurality of additional machine readable vectors; and identify a set of machine readable vectors, from the plurality of additional machine readable vectors, that match the machine readable vector within a range. The system also includes a display device configured to display a set of rules that correspond to the set of machine readable vectors.

In general, in another aspect, one or more embodiments relate to a non-transitory computer readable storage medium comprising computer readable program code, the computer readable program code for causing a computer system to receive a rule comprising text. The computer readable program code is also for causing the computer system to pre-process the rule by replacing terms in the rule with a plurality of dummy tokens denoting a plurality of entities. The computer readable program code is also for causing the computer system to generate, using a first machine learning model which takes the plurality of dummy tokens as input, a dependency graph comprising a rooted tree having a plurality of nodes related by a plurality of edges that are tagged according to a plurality of dependency tags. The computer readable program code is also for causing the computer system to generate, using a second machine learning model which takes the dependency graph as input, a canonical version of the dependency graph, wherein the canonical version comprises a canonical graph having a plurality of node labels. The computer readable program code is also for causing the computer system to sort the plurality of node labels into a lexicographic order to form a document. The computer readable program code is also for causing the computer system to generate, using a third machine learning model which takes the document as input, a machine readable vector that embeds the document as a sequence of numbers representative of a structure of the rule. The computer readable program code is also for causing the computer system to compare the machine-readable vector to a plurality of additional machine readable vectors. The plurality of additional machine readable vectors corresponds to a plurality of additional rules for which a plurality of computer useable program code blocks has been generated. The computer readable program code is also for causing the computer system to identify a set of machine readable vectors, from the plurality of machine readable vectors, that match the machine readable vector within a range, wherein the set of machine readable vectors correspond to a set of rules from the plurality of additional rules. The computer readable program code is also for causing the computer system to display the set of rules to a user.

Other aspects of the invention will be apparent from the following description and the appended claims.

BRIEF DESCRIPTION OF DRAWINGS

FIG. 3A, FIG. 3B, FIG. 3C, FIG. 3D, FIG. 3E, FIG. 3F, and FIG. 3G show an example of a process of finding code for a structurally similar rule in accordance with one or more embodiments.

DETAILED DESCRIPTION

Figure 1:
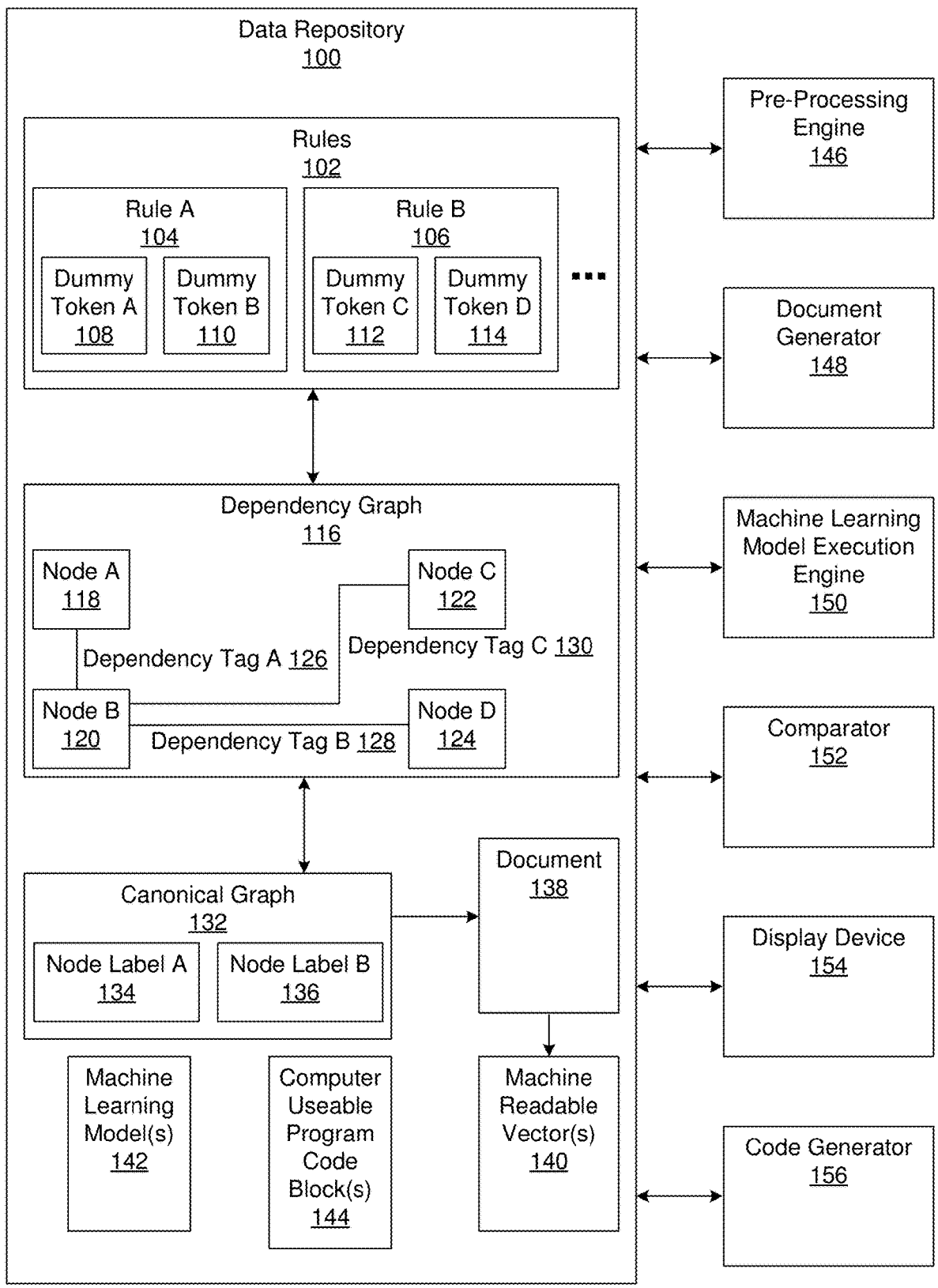
FIG. 1 is a system in accordance with one or more embodiments.

Specific embodiments of the invention will now be described in detail with reference to the accompanying figures Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to using machine learning to automatically embed the structure of natural language rules into machine readable vectors. In other words, the one or more embodiments may be used to convert rules expressed in natural language text to machine readable vectors that encode how the rule is structured. For example, the one or more embodiments may be used to convert the natural language rule "add one plus one" into a machine readable vector that not only embeds the rule of adding "1" to itself, but also embeds the structure of the rule, which is the addition of two constants. While such a rule is trivial in structure, using a computer to embed the structures of complex rules is not being accomplished using conventional techniques. The one or more embodiments are capable of embedding the structures of complex rules. Once embedded, the machine readable vectors may be compared in order to find rules that are structurally similar to each other.

In use, the embedding techniques described herein may be used to improve the process of coding many rules. For example, assume thousands of natural language rules are to be encoded in computer readable program code. A programmer would thus find it advantageous to reuse, recycle, or copy from previously written computer code from previously coded rules, as much as possible. However, it is difficult to find the rules (for which code has been written) that have structures similar to the structure of a rule to be coded. The one or more embodiments can be used to compare the structure of the rule to be coded to the structures of other rules for which computer code has already been written. A programmer may then select an existing rule structurally similar to the rule to be coded (within a threshold degree), access the already-written program code for the existing rule, and then more quickly encode the current rule by recycling, reusing, copying, or otherwise drawing from the existing program code.

Figure 6A:
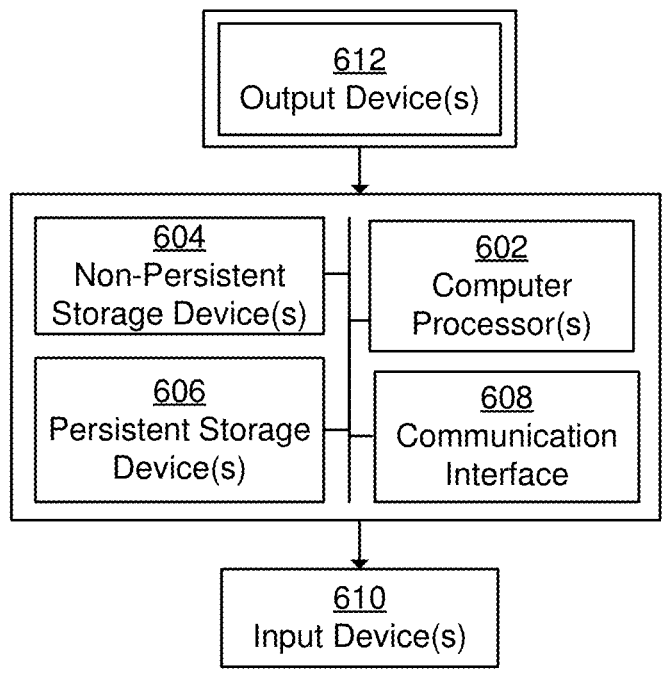
FIG. 6A and FIG. 6B show a computing system in accordance with one or more embodiments.
Figure 6B:
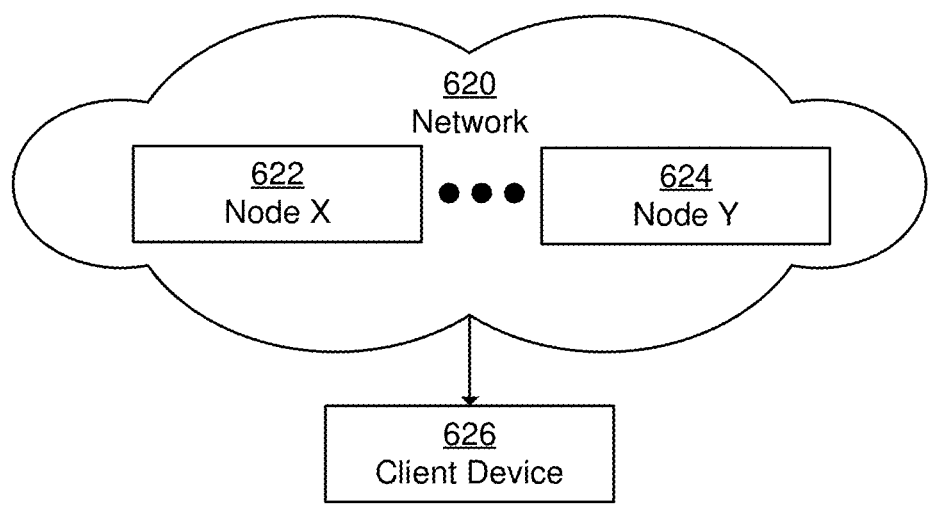

FIG. 1 is a system in accordance with one or more embodiments. The system shown in FIG. 1 may be implemented by one or more computers in a possibly distributed computing environment, such as shown in FIG. 6A and FIG. 6B.

In one or more embodiments, the data repository (100) is any type of storage unit and/or device (e.g., a file system, database, collection of tables, or any other storage mechanism) for storing data. Further, the data repository (100) may include multiple different storage units and/or devices. The multiple different storage units and/or devices may be of the same type or located at the same physical site, virtualized, or in the cloud.

In one or more embodiments, the data repository (100) stores a variety of information used in the techniques described with respect to FIG. 2 and FIG. 3A through FIG. 3G. The data repository (100) may include rules (102), such as rule A (104) and rule B (106). A rule is a principle of regulation governing conduct, action, procedure, arrangement, etc. A rule may be textual. For example, a tax rule may be "the adjusted taxable income for a taxpayer is the taxpayer's income less allowable deductions." Such a rule is termed a "natural language rule," because the rule is expressed in human-readable text; namely, the English language. Another natural language rule could be a game rule, such as a rule that describes, in part, how the game of chess is played.

Figure 2:
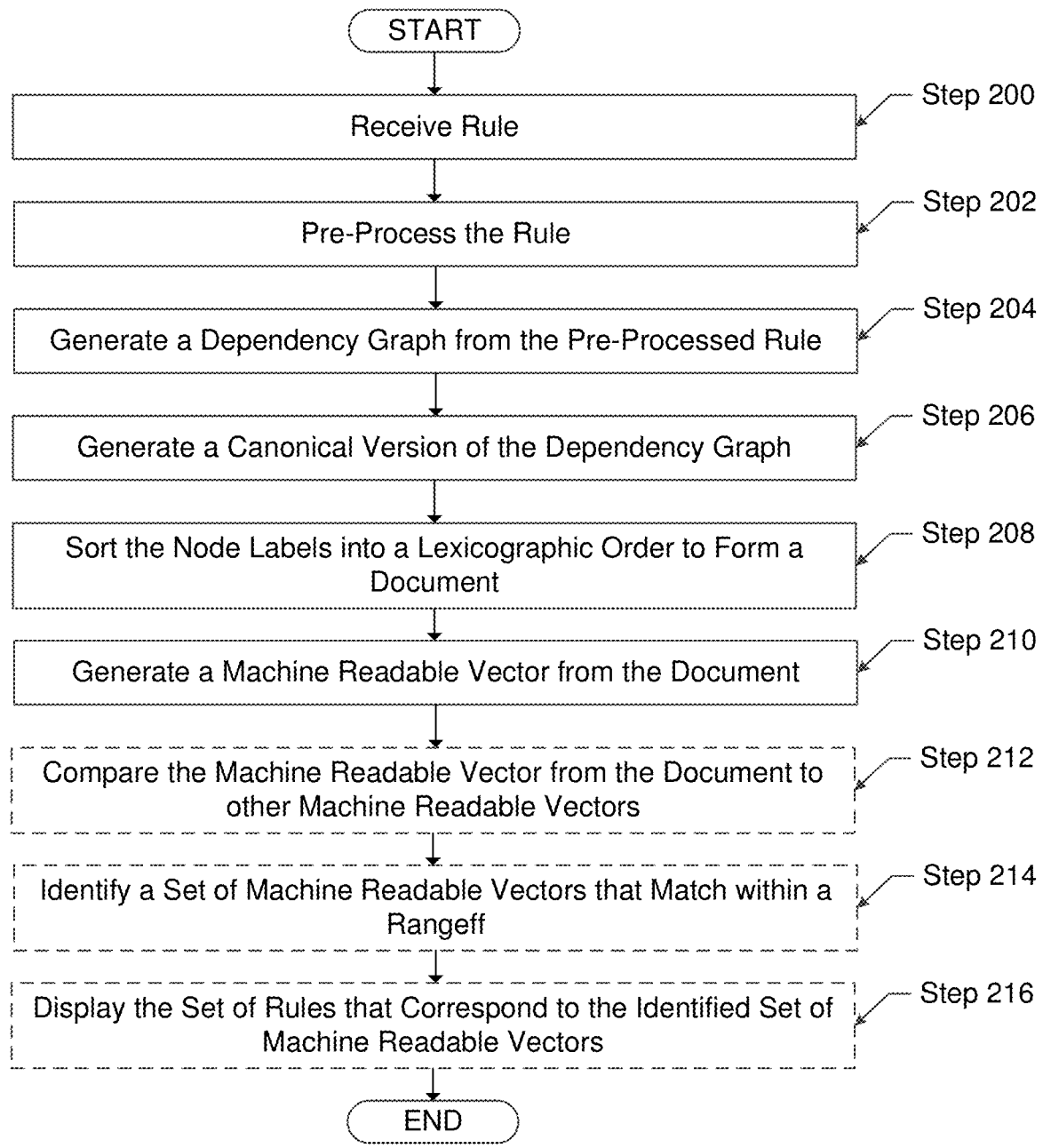
FIG. 2 is a method in accordance with one or more embodiments.

The one or more embodiments contemplate embedding natural language rules, and the structure of natural language rules, into a machine readable vector, according to the techniques described with respect to FIG. 2. However, the one or more embodiments are not limited to natural language rules. The one or more embodiments may also be other types of rules, such as rules written in computer readable program code, sometimes referred to simply as "code" herein. Rules expressed in computer useable program code, as well as the structure of such a rule, may also be embedded into a machine readable vector according to the techniques described with respect to FIG. 2.

To prepare a rule for the process of embedding into a machine readable vector, the terms of a rule may be converted into dummy tokens. Thus, data repository (100) may include dummy tokens for various rules. For example, dummy token A (108) and dummy token B (110) for Rule A (104), and also dummy token C (112) and dummy token D (114) for rule B (106). As used herein, a dummy token is a machine-readable symbol or one or more alphanumeric numbers that represent a term as a whole. The words of a natural language rule may be represented as dummy tokens to prevent a parser program from treating a term as an object that can be further parsed. For example, in the natural language tax rule used above, the term "adjusted taxable income" may be a single term replaced by a dummy token, because the "adjusted taxable income" is a single entity in the rule. Thus, each dummy token represents a single entity.

In one or more embodiments, the data repository (100) also stores a dependency graph (116). A dependency graph is a graph which relates terms to each other via edges. An example of a dependency graph is shown in FIG. 3B. As described further with respect to FIG. 2, the rules (102) are converted into the dependency graph (116), with the dummy tokens forming the nodes of the graph. The nodes are related to each other by edges, which indicate the relationships between two or more nodes. The edges are formed from parts of speech tags that indicate the parts of speech relationships between the terms.

Thus, the dependency graph (116) includes a number of nodes, such as node A (118), node B (120), node C (122), and node D (124) in accordance with one or more embodiments. As indicated above, a node as described herein is a dummy token. Thus, for example, node A (118) may represent dummy token A (108), node B (120) may represent dummy token B (110), node C (122) may represent dummy token C (112), and node D (124) may represent dummy token D (114).

As indicated above, the nodes of the dependency graph (116) are related to each other via edges tagged with dependency tags, as indicated by the lines joining the nodes in FIG. 1. For example, the edge connecting node A (118) and node B (120) is tagged with dependency tag A (126). The edge connecting node B (120) to node D (124) is tagged with dependency tag B (128). The edge connecting node B (120) to node C (122) is tagged with dependency tag C (130). Each of the dependency tags are typically parts of speech tags. The parts of speech tags convey, at least in part, the structure of the natural language rules by logically relating the dummy tokens (i.e., terms in the rule) to each other.

Because the dependency graph (116) is a group of nodes connected to each other via edges, the dependency graph (116) may take the form of a tree, and thus may be termed a tree or a dependency tree in accordance with embodiments. When the dependency graph (116) includes a root node, then the dependency graph (116) may be termed a rooted tree. A root node is a node to which many, possibly all, other nodes are connected in the dependency graph (116).

In one or more embodiments, the primary task of interest is to find rules that are structurally similar to each other, as opposed to fining rules that are similar to each other in word or effect. For example, the rule "Add box A to box B, and then divide by 5" is structurally similar to "Subtract box D from box E and then multiply by box F." While the words and effects of the two rules are different, the structure of the rules remains similar because both rules involve performing addition or subtraction between first and second objects and then performing a multiplication or division operation on the addition/subtraction result. Because the one or more embodiments contemplate finding rules that are structurally similar to a rule of interest, it may not be necessary that the rules be the same in word or effect in order to be useful to a user.

Thus, the data repository (100) also stores a canonical graph (132). The canonical graph (132) is the output of a machine learning model which takes the dependency graph (116) as input. The process of converting the dependency graph (116) to the canonical graph (132) may be called canonicalization. In general, canonicalization is a process for converting data that has more than one possible representation into a standard, or canonical, form. With respect to the one or more embodiments, canonicalization identifies common labels for nodes in the dependency graph (116) by the type of tag. This process is described with respect to FIG. 2 and FIG. 3D.

The canonical graph (132) may also be a tree graph, though having different node labels than the dependency graph (116). In particular, the canonical graph (132) has node label A (134) and node label B (136). A node label is a label that indicates the type of relationship a node has to another node in the canonical graph (132). Because the nodes of the canonical graph (132) are still considered dummy tokens, the node labels cause the canonical graph (132) to represent the structure of a rule, such as rule A (104).

The data repository (100) also stores a document (138), which is formed from the canonical graph (132) according to the techniques described with respect to FIG. 2 and FIG. 3E. A document, as used herein, is defined as the set of node labels in the canonical graph (132) sorted in lexicographic order. Thus, the document (132) is, in FIG. 1, node label A (134) and node label B (132) sorted in lexicographic order. The process of sorting the node labels in lexicography order is described with respect to FIG. 2. According to one or more embodiments, the term "lexicographical order" means an alphabetic ordering of alphanumeric tokens, possibly together in a single string. For example, tokens "BX1" and "AX2" may be sorted into a final string of "AX2BX1". Most generally, lexicographical order is a generalization of the way words are alphabetically ordered based on the alphabetical order of the component letters. When alphanumeric text is sorted in lexicographical order, what is defined is a total order over the sequences of elements (strings) of a finite totally ordered set, which may be referred-to as an alphabet.

The data repository (100) also stores one or more machine readable vector(s) (140) in accordance with one or more embodiments. A machine readable vector is a series of characters organized as a data structure and is readable by a computer. For example, the machine readable vector(s) (140) may be a 1×256 dimensional string of numbers but could take many different dimensional forms. The machine readable vector(s) (140) are derived from the application of machine learning to the document (138), as described with respect to FIG. 2. In this manner, each of the machine readable vector(s) (140) embeds a corresponding document (e.g. document (138)) and ultimately a corresponding rule (e.g. rule (104)), as a sequence of numbers representative of a structure of the corresponding rule. In this manner, the structure of each rule in the rules (102) may be represented by a machine readable vector in the machine readable vector(s) (140).

The data repository (100) also stores one or more machine learning model(s) (142) in accordance with one or more embodiments. In general, machine learning is a method of data analysis that automates analytical model building and is a branch of artificial intelligence based on systems that can learn from data, identify patterns, and make decisions with minimal human intervention. A machine learning model is a mathematical algorithm which identifies patterns in data. A machine learning model is trained by passing known training data to the machine learning model, which finds patterns in the training data such that the input parameters correspond to the target. The output of the training process is a trained machine learning model.

Many different kinds of machine learning models exist. The one or more embodiments contemplate, in one specific example, using at least three different kinds of machine learning models. The three machine learning models include, but are not limited to, a natural language processing machine learning model, a Weisfeiler-Lehman (WL) algorithm, and an unsupervised machine learning model trained to convert the document (138) to the machine readable vector(s) (140). Use of these machine learning models is described further with respect to FIG. 2 and FIG. 3A through FIG. 3E.

The data repository (100) may also store one or more computer useable program code block(s) (144) in accordance with one or more embodiments. The computer useable program code block(s) (144) are discrete sets of computer useable program code, or more simply, "code". Each block of code provides instructions to a computer to perform a function or execute an algorithm. A block of code may, for example, be the machine-useable form of a rule in the rules (102).

The one or more embodiments contemplate that the data repository (100) may store numerous blocks of code. Each block of code would require human analysis to determine if a given block of code implements a rule that is structurally similar to a rule of interest that is to be coded. Manually finding particular blocks of code in thousands of the computer useable program code block(s) (144) that encode rules that are structurally similar to the rule of interest is complicated and practically infeasible. Thus, the one or more embodiments contemplate that each of the rules (102) has a corresponding vector in the machine readable vector(s) (140) for comparison, and also that each of the rules (102) has a corresponding block of code in the computer useable program code block(s) (144). As a new rule is to be encoded, the new rule is embedded into a new machine readable vector, which is then added to the machine readable vector(s) (140). A comparison can then be made between vectors, and the corresponding code blocks for structurally similar rules exposed to a computer programmer. This process is described in detail with respect to FIG. 2. A specific example of this procedure is described with respect to FIG. 3E through FIG. 3G.

The system shown in FIG. 1 also includes a number of other features in addition to the data repository (100). For example, the system shown in FIG. 1 also includes a pre-processing engine (146), which is communicatively connected to the data repository (100). The pre-processing engine (146) is software and/or hardware configured to pre-process the rules (102) by replacing terms in the rule with the dummy tokens. This process is described with respect to FIG. 2.

The system shown in FIG. 1 also includes a document generator (148), which is communicatively connected to the data repository (100). The document generator (148) is software and/or hardware configured to sort the node labels in the canonical graph (132) into a lexicographic order to form the document (138). This process is described with respect to FIG. 2.

The system shown in FIG. 1 also includes a machine learning model execution engine (150), which is communicatively connected to the data repository (100). The machine learning model execution engine (150) is software and/or hardware configured to execute the machine learning model(s) (142). The machine learning model execution engine (150) may be configured to execute a first machine learning model in the machine learning model(s) (142) which receives as input the of dummy tokens and outputs the dependency graph (116). The machine learning model execution engine (150) may be configured to execute a second machine learning model in the machine learning model(s) (142) which receives as input the dependency graph (116) and outputs the canonical graph (132). The machine learning model execution engine (150) may be configured to execute a third machine learning model in the machine learning model(s) (142) which receives as input the document (138) and outputs the machine readable vector in the machine readable vector(s) (140). The above three processes are described with respect to FIG. 2.

The system shown in FIG. 1 may also include a comparator (152), which is communicatively connected to the data repository (100). The comparator (152) is software and/or hardware configured to compare the machine readable vector(s) (140) to each other or to a new machine readable vector. The comparator (152) is also configured to identify a set of machine readable vectors, from the machine readable vector(s) (140), that match a specified machine readable vector within a range. The range may be a mathematically defined value based on a Euclidian distance between vectors on a vector graph. The operation of the comparator (152) is described with respect to FIG. 2.

The system shown in FIG. 1 may also include a display device (154), which is communicatively connected to the data repository (100) and includes the necessary hardware and software functionality to display one or more images to a user. The display device (154) may be any human-readable device which a human can use to visualize computer input or output. Thus, the display device (154) may be a monitor, a touch screen, and the like. The display device may be controlled by the same processor which controls the pre-processing engine (146), the document generator (148), the machine learning model execution engine (15), and the comparator (154). Thus, the display device (154) may be configured to display the rules (102) that correspond to the machine readable vector(s) (140), and also may be configured to display one or more of the computer useable program code block(s) (144). An example of a display device may be output device(s) (612) in FIG. 6A.

The system shown in FIG. 1 may also include a code generator (156), which is communicatively connected to the data repository (100). The code generator (156) is software and/or hardware configured with functionality to generate code that implements a rule in a computer. The code generator (156) may operate automatically. The code generator (156) may be configured to implement one or more of the rules (102) in a computer by re-using at least some of the computer useable program code block(s) (144) for the rules (102).

While FIG. 1 shows a configuration of components, other configurations may be used without departing from the scope of the invention. For example, various components may be combined to create a single component. As another example, the functionality performed by a single component may be performed by two or more components.

FIG. 2 is a flowchart of a method in accordance with one or more embodiments of the invention. The method shown in FIG. 2 may be implemented in the system shown in FIG. 1 or may be implemented using the devices shown in FIG. 6A and FIG. 6B. The method shown in FIG. 2 may be characterized as a method, in a computer, for finding a set of rules that is structurally similar to a rule of interest.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention.

As another example, determination steps may be performed by performing a test, such as checking a data value to test whether the value is consistent with the tested condition in accordance with one or more embodiments of the invention.

At step 200, a rule is received in accordance with one or more embodiments. The rule may be received via a data input device. The rule may be a natural language rule that a programmer has been tasked to encode into computer readable program code. In an embodiment, the programmer inputs natural language text that defines the rule into the input device.

At step 202, the rule is pre-processed in accordance with one or more embodiments. The rule may be pre-processed by replacing terms in the rule with a number of dummy tokens. In particular, each term in the rule is replaced with a corresponding unique dummy token. The process of replacing terms with dummy tokens may be performed by identifying words or phrases in the rule that represents a unique entity. The user may specify that certain phrases of words are to be treated as entities and thus receive a unique dummy token.

At step 204, a dependency graph is generated from the pre-processed rule in accordance with one or more embodiments. The dependency graph may be generated using a machine learning model which takes the dummy tokens as input. More specifically, the dependency graph may be generated using a natural language processing machine learning model. The machine learning model outputs a rooted tree having nodes related by edges that are tagged according to dependency tags.

The natural language machine learning model may be trained by inputting into the model known natural language terms which correspond to known dummy tokens. When the machine learning model outputs a result close to the known dummy tokens, the model is considered trained.

At step 206, a canonical version of the dependency graph is generated in accordance with one or more embodiments. The canonical version of the dependency graph may be generated by inputting the dependency graph into another machine learning model. The machine learning model at step 206 may be a Weisfeiler-Lehman (WL) algorithm. The WL algorithm may be repeatedly applied to the output of a prior WL algorithm execution until the node labels converge. A result of applying the machine learning model at step 206 is a canonical graph having node labels, as described with respect to FIG. 1. Details regarding training of the WL algorithm are conventional and known in the art.

At step 208, the node labels are sorted into a lexicographic order to form a document. The document is, in one or more embodiments, a string of alphanumeric text corresponding to the node labels in lexicographic order. Thus, for example, a document may be "hdfs234 hgdfer33," which might have been multiple labels run together separated by spaces. In other words, the document is a concatenation of different tokens separated by spaces. Each token is alphanumeric text with no spaces within a given token.

At step 210, a machine readable vector is generated from the document in accordance with one or more embodiments. The machine readable vector is generated by another, different machine learning model. This third machine learning model takes the document from step 208 as input, and outputs a sequence of numbers. The sequences of numbers effectively embed the document, and because the sequence of numbers is based on the canonical graph, effectively represents the structure of the rule received at step 200.

Training the unsupervised learning model may proceed as follows. Each rule (e.g., tax rule) is given a unique identifier. Training then proceeds using a neural network that takes the identifier of a rule as input and generates vectors corresponding to the alphanumeric tokens present in the post WL version of the rule as outputs. An example of the outputs may be a skipgram model.

The remaining steps in the method of FIG. 2 are optional, because they represent one application of the one or more embodiments described with respect to step 200 through step 210. The process described with respect to step 200 through step 210 embeds the structure of a rule into a machine readable vector, which can then be used in a variety of applications.

Some examples of possible applications for the above-described technique are as follows. In one example, the one or more embodiments may be used to identify tax rules that have changes over time periods (e.g., yearly as tax rules are updated by a government agency). The difference in the embeddings across years reflects the extent to which a tax rule has changed. In another example, the one or more embodiments may be used to identify which steps are changed in a business process workflow. In still another example, the one or more embodiments may be used to identify tax rules which are pairwise similar to each other. This embodiment may be used to create clusters of tax rules where rules within a cluster are similar.

At step 212, the machine readable vector from the document is compared to other machine readable vectors in accordance with one or more embodiments. Each of the other machine readable vectors correspond to rules for which computer useable program code blocks have been generated. Comparing the machine readable vectors may be performed by plotting each machine readable vector on a vector graph having "N" dimensions, where "N" is the dimensional space of the machine readable vector. A value for "N" may be 256. Then, the Euclidian distance between any two vectors on the graph may be calculated. Because each machine readable vector embeds the structure of a rule, the Euclidian distance between two machine readable vectors is a measure of the structural similarity between two rules. As an alternative, using the vector graph, a nearest neighbor retrieval may be performed between the machine readable vector and the additional machine readable vectors over a dimensional space of the machine readable vector.

A programmer, or some other automatic computer process, may set a threshold or a pre-determined degree of similarity for purposes of comparing. For example, if two rules are within the pre-determined Euclidian distance, or degree of similarity, then a rule might be selected for presentation to a user. Otherwise, a rule is not selected, or may be discarded from a list of rules being created as a result of comparing at step 210.

Thus, at step 214, as a result of comparing, a set of machine readable vectors are identified that match within a range in accordance with one or more embodiments. In particular, a set of machine readable vectors are identified, from all machine readable vectors being compared, that match the machine readable vector from step 210 within the range.

Then, at step 216, the set of rules corresponding to the identified set of machine readable vectors are displayed to a user. The set of rules may be displayed as an ordered list, with the rules having the closest structural similarity to the rule received at step 200 displayed at the top of the list.

The method described with respect to FIG. 2 has a specific embodiment in a coding project that seeks to turn many, perhaps thousands, of natural language rules into computer useable program code. Assume that, from step 216, the set of rules being displayed each have already been coded. Each rule constitutes a program code block. The program code blocks corresponding to each structurally similar rule being displayed may also be displayed to the programmer. The programmer may then generate new computer useable program code configured to implement the rule in a computer by re-using at least some of the existing code.

The method described with respect to FIG. 2 may be varied in other ways in accordance with one or more embodiments, as well. For example, a different type of display be may be presented to the user at step 216. In particular, the machine readable vector may be clustered with the additional machine readable vectors to form a Voronoi diagram. Distances between the machine readable vectors may be calculated and displayed using the Voronoi diagram. Each distance represents a similarity in structure between two rules.

FIG. 3A, FIG. 3B, FIG. 3C, FIG. 3D, FIG. 3E, FIG. 3F, and FIG. 3G show an example of a process of finding code for a structurally similar rule in accordance with one or more embodiments. The process shown in FIG. 3A through FIG. 3G is a specific example of the method shown in FIG. 2. The process shown in FIG. 3A through FIG. 3G may be implemented, for example, using the system shown in FIG. 1 or the system shown in FIG. 6A and FIG. 6B.

The example of FIG. 3A through FIG. 3G is provided in the context of tax accounting software. The following example is for explanatory purposes only and not intended to limit the scope of the invention.

Converting tax rules provided by agencies like the Internal Revenue Service (IRS) into code in an object-oriented programming language like JAVA®, C++, C #, Python, Ruby, etc. is a major activity at most accounting or financial software companies. For several domains, like payroll, the tax rules are quite complicated and cannot be automatically parsed into computer code with the state of the art parsers. Hence, teams of developers and business analysts look at the tax rules and manually convert the IRS rules into computer useable program code. This process is tedious and has to be applied not only to federal rules, but also to rules for states, counties, and even cities or possibly foreign jurisdictions. For a specific concept like annual gross wages, tax rules for federal and other agencies have some similarity, but usually are not exactly the same, thereby further complicating the monumental task of manually writing program code when starting from scratch for each rule.

The problem may be defined mathematically, as follows:
1. Let E be the set of tax rules for which <tax_rule, converted_to_code> tuples have already been created.
2. Let N be the set of tax rules for which the "code" versions have yet to be created.
3. The problem is, given a rule r∈N, find a rule p∈E: sim(r,p)>1−ϵ. Here, "sim" represents structural similarity (as opposed to token based similarity) and 1−ϵ is a threshold, where ϵ is an integer and ϵ≥0.
4. The term "sim" may be further defined. Assume that there exists a rule r'="Multiply gross wages per pay period by annual number of pay periods". The code version of this rule might look like mul(x,y). Then, if a line p'="divide annual tax payable by the number of pay periods", then sim(r',p') might be close to 0.8. The number represents distance between machine readable vectors on a graph, as explained above. The reason is that what is of interest is the predicate argument structure of the rule (an arithmetic operator that takes two operands) rather than the specific choice of the predicate and arguments.

When converting an unseen rule to code, business analysts want to see whether they can use the already converted rules as hints to convert the unseen rule to code. Since tax instructions have several thousand rules per domain, manually doing this search is very complicated and practically infeasible. Thus, the one or more embodiments provide for a method to create embeddings of tax rules and then perform a nearest neighbor search over these embeddings to identify and surface these "seen" rules that are structurally similar to the current "unseen" rule. Since what is of interested is a notion of structural similarity, as opposed to pure sentence similarity, the kind of embeddings which can be created by the machine learning model "word2vec" may not be suitable. However, the one or more embodiments provide for automatically creating embeddings that capture the structural similarity across rules.

Turning now to FIG. 3A, a natural language rule (300) is shown. The natural language rule is "Add ZC12 to PW5 but Subtract Five." The terms "ZC12" and "PW5" represent cells in a tax calculation worksheet promulgated by the IRS, and thus are variables representing real numbers.

First, the natural language rule (300) is pre-processed. In particular, the terms used in the natural language rule (300) are replaced with dummy tokens denoting entities. In this manner, subsequently used processes treat each term as an entity that is not further parsed. In other words, terms (i.e., words) are parsed, not the letters that form the words.

Second, the pre-processed data is converted into a dependency tree using a natural language machine learning processing technique. FIG. 3B shows such a dependency tree (302) composed of a root (304); three nodes: node (306), node (308), and node (310); and three edges: edge (312), edge (314), and edge (316). The different hash patterns of node (306), node (308), and node (310) indicate that the edges (parts-of-speech tags) at initialization might all be different.

Shallow representations, like the parts-of-speech tagging shown in FIG. 3B, do not capture sufficient richness in the structure of the natural language rule (300). On the other hand, a full or deep parse into the final calculation would work, but such deep parses require a very strict grammar. Strict grammar makes the parser brittle to variants of the same tax rule expressed using a different choice of words, tense, etc. Moreover, where the final decision of whether a rule is sufficiently similar rests on the analysts, the techniques described herein are usually applied to complex sentences such that they cannot be readily parsed by the state of the art parsers. Thus, the machine learning model is trained to use Universal Dependencies as the optimal parsing level with respect to capturing structural properties of the tax rule and parsing a good range of sentences naturally occurring in English, and thus providing an alternative that is not brittle Continuing the example, FIG. 3C shows a specific example of the dependency graph (302) shown in FIG. 3B. In particular, the dependency graph (318) in FIG. 3C was generated using natural language processing machine learning applied to the natural language rule (300) shown in FIG. 3A.

In this case, the root node is "1", referring to the term "add." Three five primary leaf nodes are directly related to the root node: node "5," representing the word "but;" node "6," representing the word "subtract;" node "4," representing the word "PW5;" and node "2", representing the word "ZC12." Each of node 2, 4, 5, and 6 have one edge to the root node 1, as shown in FIG. 3C. Each edge is tagged with a part of speech for the corresponding word.

In addition, dependent leaf nodes are connected to two of the primary leaf nodes. Node 6 is connected to node "7," representing the word "five." Node 4 is connected to node "3," representing the word "to." Again, the edge between node 6 and node 7, and the edge between node 4 and node 3, are tagged with a part of speech tag.

Turning now to FIG. 3D, in order to create an embedding for the natural language rule (100) in FIG. 3A which also preserves the structure of the rule, the dependency graph in FIG. 3B (and hence FIG. 3C) may be converted into a canonical graph. The canonical graph is represented in FIG. 3D in accordance with one or more embodiments.

Like the dependency graph (302) in FIG. 3B, the canonical graph (320) includes a root node (322), three leaf nodes (including leaf node (324), leaf node (326), and leaf node (328)), and three edges that connect the root node (322) to the leaf nodes. The edges are edge (330) connecting the root node (322) to the leaf node (324), edge (332) connecting the root node (322) to the leaf node (326), and edge (334) connecting the root node (322) to the leaf node (328). However, as indicated by the similar hashing patterns shown in all three leaf nodes, the leaf nodes have the same tags as a result of the process of converting the dependency graph (302) to the canonical graph (320). This result occurs because all three leaf nodes in the dependency graph (320) have similar connectivity with the root node (304) in the dependency graph (302).

Continuing with the example, a second machine learning model is used to perform the conversion between the dependency graph (302) and the canonical graph (320). Several graph kernel algorithms exist that can be classified into three sub-groups: graph kernels based on walks, graph kernels based on limited-size subgraphs and graph kernels based on subtree patterns. The one or more embodiments use the third class and in particular, as indicated above, a the 1-dimensional variant of the Weisfeiler-Lehman (WL) algorithm, also known as "naive vertex refinement."

In particular, a series of iterations of the WL algorithm may be performed on the dependency graph (302). The WL algorithm may be executed multiple times on the dependency graph (302) until the node labels converge (i.e., do not change across iterations). In this manner, the WL algorithm may be used to create a graph kernel. The graph kernel may be used to canonicalize the dependency graph (302) of lines in the natural language rule (300).

Attention is now turned to machine readable vector (336) shown in FIG. 3E. The machine readable vector (336) may be created from the canonical graph (320) using a third machine learning model.

After creating the node labels (i.e., edge (330), edge (332), and edge (334)), the node labels are sorted in lexicographic order. In this manner, the natural language tax rule becomes a document with the sorted node labels as tokens.

Thereafter, an embedding is created for the document using the doc2vec machine learning algorithm. The result of embedding is the sequence of numbers shown in the machine readable vector (336) shown in FIG. 3E. In the example shown, the machine readable vector (336) is a 256-dimensional vector. Because the embedding is created from the node labels of the canonical graph (320), the embedding of the machine readable vector (336) also stores the structural nature of the natural language rule (300).

Once the vector is produced, further operations may be performed on the vector. For example, the vector may be compared to other vectors created for other rules using graph analysis, cluster analysis, or other forms of mathematical analysis. Two machine readable vectors that are considered "close;" i.e., within a pre-defined mathematical distance of each other, by definition will have corresponding rule structures that are similar to each other. This fact can be used to quickly find and retrieve rules that are structurally close to a rule of interest.

Attention is now turned to FIG. 3F and a specific use for the rule structure embedding technique shown in FIG. 3A through FIG. 3E. The machine readable vector (336) is the rule of interest. The machine readable vector (336) is compared to many other machine readable vectors contained within box (338). Using a k-clustering technique, described below, the relative distances between the machine readable vector (336) and the other machine readable vectors in box (338) may be generated and then compared to each other. In this case, machine readable vector (340) and machine readable vector (342) are considered within a pre-determined distance of the machine readable vector (336).

The purpose of performing the preceding steps described with respect to FIG. 3A through FIG. 3F is to aid a programmer to find computer useable program code that has already been written for an existing rule with a similar rule structure. In this manner, the programmer can quickly identify similar rules for which computer useable program code has already been written. Once identified and selected, the programmer can recycle, re-use, copy, or otherwise take advantage of the computer useable program code that has already been written for the older rule when coding computer useable program code for the natural language rule (300) that now is to be converted into computer useable program code.

Thus, continuing the example from above and turning to FIG. 3G, computer useable program code (344) corresponds to a computer program which encodes the pre-existing rule that corresponds to the machine readable vector (342). In this example, the machine readable vector (342) is mathematically closest to the machine readable vector (336) which embeds the structure of the natural language rule (300) in FIG. 3A. The programmer views the rule that corresponds to machine readable vector (342), confirms that the rule is structurally similar to the natural language rule (300), and then recycles and reuses the computer useable program code (344) as part of the process of encoding the natural language rule (300) into computer useable program code. The programmer notes, in this case, that only a few changes need to be made to the computer useable program code (344), thereby dramatically increasing the speed at which the programmer can encode the natural language rule (300).

Stated differently, once embeddings have been created for each line in every tax rule, a programmer can use these embeddings to guide or provide hints to business analysts for converting rules to code. Assume, for the purposes of this portion of the example, that a small set of rules has been already converted to the code form. This small set should be diverse and should have good support over the different types of lines in the tax rules.

When converting a new rule, p, into code, the analyst is presented with an ordered list L of structurally similar rules retrieved from the rules which already have been converted to code. This list has up to 5 rules, in the form: [r1, r2, . . . r5]. The rules are retrieved and appended to the list in order of increasing Euclidean distance from the new line p. Only lines which match a high enough threshold are finally shown to the analyst, because the intent is to keep the recommendations very relevant.

The analyst looks at the code versions of the rules in L: [code(r1), . . . code(r5)]. In the best case, the programmer might use a direct way to write the code version. In the worst case, the results provide the programmer hints on how to write the code version of line p under consideration.

Attention is now turned to a specific example test. The example test was conducted on an AWS® SAGEMAKER® instance with type ml.m5. 4×large which has 6 vCPUs and 64 GB memory. This configuration was used because tens of thousands of tax rules were analyzed, and several of the steps in the above-described techniques are compute intensive. For the WL algorithm, an in-house multi-core implementation was used in PYTHON®. For the doc2vec model, an implementation from gensim2 was used.

With this setup, the overall time for creating the embeddings is roughly 5 minutes. When the analyst needs to get hints for writing code versions of new lines, a nearest neighbor retrieval is performed over a 256 dimensional space. This retrieval may be performed using an exact Euclidean distance computation using a multi-core implementation. The entire set of lines for tax rules was loaded up in shared memory and available when the analyst logs in. Finally, instrumentation may be provided to capture user interactions so that the system can identify when a user decides to use the recommendation and also when they do not. In both cases, the code written by the user is written to a database and the resulting tuple: <line in tax rule, code version> is appended to the list of known lines so that the tuple is available for retrieval.

Figure 4:
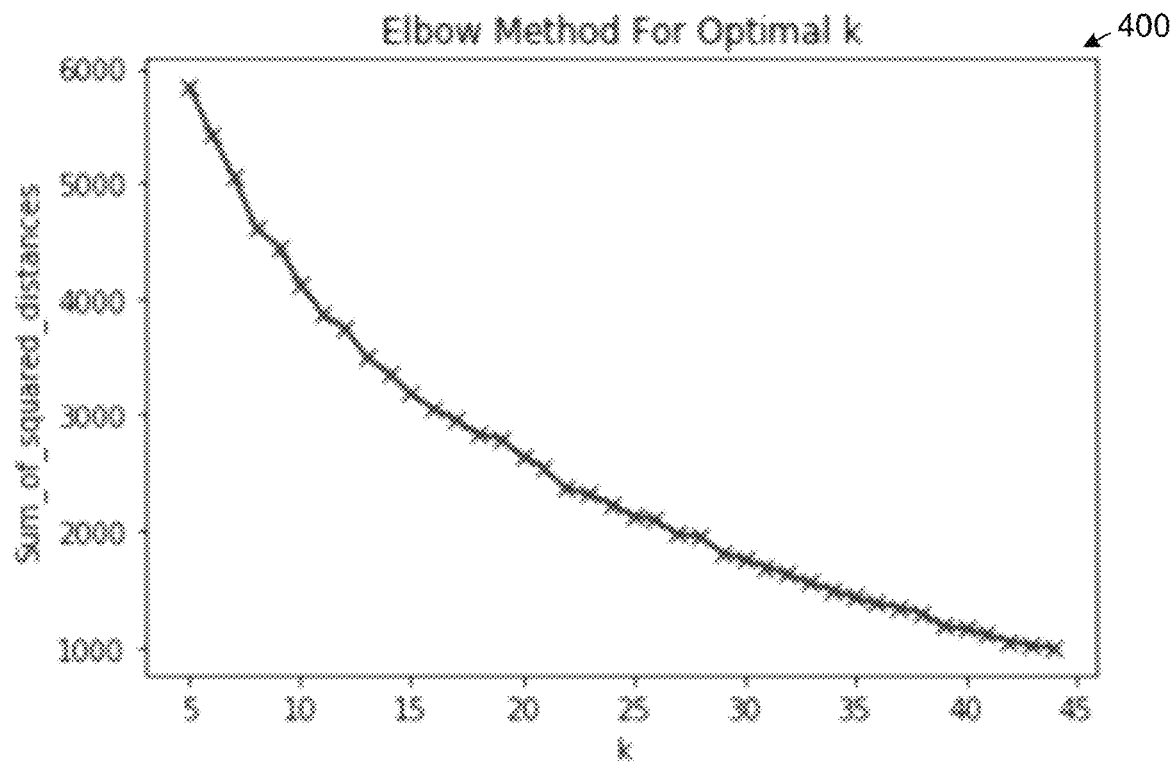
FIG. 4 shows a graph of "k" versus a sum of squared distances for clusters of rule embeddings on a graph in accordance with one or more embodiments.
Figure 5:
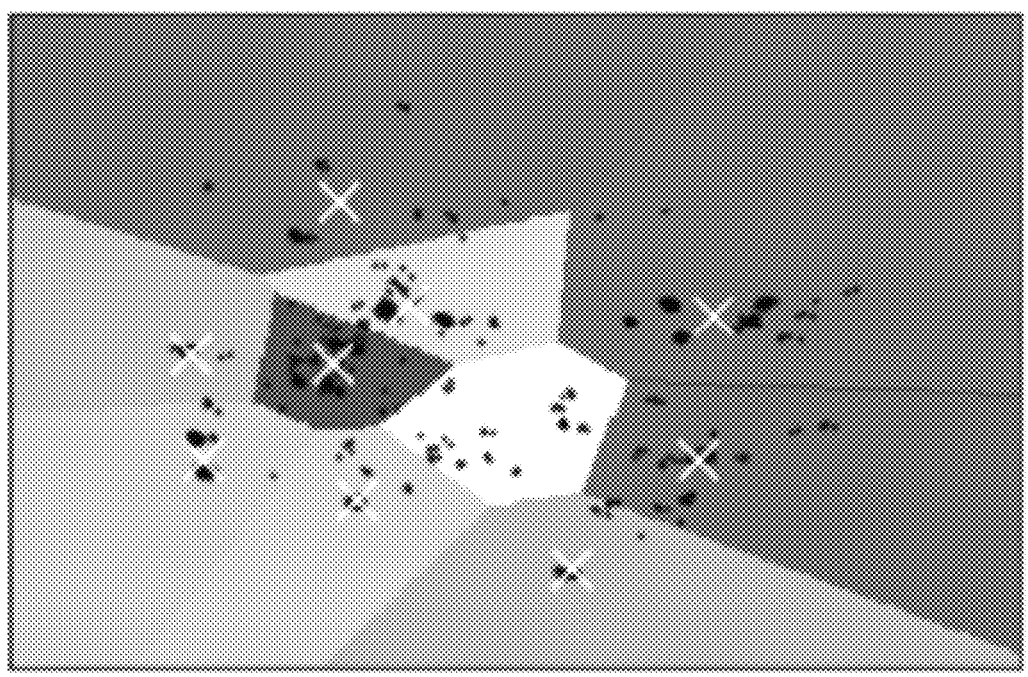
FIG. 5 shows a Voronoi diagram of cluster centroids from the clusters of rule embeddings shown in FIG. 4 in accordance with one or more embodiments.

FIG. 4 shows a graph (400) of "k" versus a sum of squared distances for clusters of rule embeddings on a graph in accordance with one or more embodiments of the invention. FIG. 5 shows a Voronoi diagram (500) of cluster centroids from the clusters of rule embeddings shown in FIG. 4 in accordance with one or more embodiments. FIG. 4 and FIG. 5 should be considered together in reference to the results and discussion presented below.

As described above and shown in FIG. 4 and FIG. 5, the one or more embodiments may be used to generate embeddings which capture the structural aspects of lines in tax rules. In one example, a corpus of rules includes 1319 lines from United States Federal and State Payroll withholding rules. As a first step after generating the embeddings, K-means clustering is used to understand whether embeddings of lines display any useful patterns. Twenty-five clusters are identified as the optimal number of clusters following the information in FIG. 4.

Next, principal component analysis is performed to reduce the number of dimensions to two so that the clusters may be visualized. While 25 clusters are chosen for other analysis, for visualization 10 clusters are partitioned in two dimensions, as shown in FIG. 5. The partition in FIG. 5 indicates well-separated clusters.

Then, starting with the largest cluster, the lines within the same cluster are examined to see whether the lines displayed similarities in the predicate argument structure of the final calculation. For lines in the same cluster, the largest cluster has lines like the following:

Line1: "Divide the annual federal tax by the annual number of pay periods."
Line2: "Divide the annual state tax by the annual number of pay periods."
Line3: "Subtract social security and Medicare taxes from total gross wages."

These lines are similar in the structural components that were to be captured. In particular, while the last line has "subtract" as a predicate, the line is still a predicate which accepts two arithmetic arguments and, in this respect, it is similar to the other two lines. The distance between Line 2 and Line 3, above, is 0.87 and the two lines lie in the same cluster, as does Line 1. The average distance of lines in the same cluster is 1.12.

For lines in different clusters, in contrast to lines in the same cluster, the average distance between lines in different clusters is ≥4.5. This result is supported by the differences in the structure of lines in different clusters.

For example, the following lines lie in different clusters and the distance between the lines is 6.27:
Line 4: "Subtract social security and Medicare taxes from regular plus supplemental wages. Note: Deduction amounts for Social Security, Medicare, or Railroad Retirement taxes are limited to $2,000 per year."
Line 5: "Calculate annual withholding tax credit by reducing the standard deduction by the withholding allowance credit reduction (not less than zero)."

In summary, the one or more embodiments may provide for a recommender system for business analysts to help them easily write programming language code for tax rules. A distinct aspect of this problem is the usefulness of creating embeddings which preserve the structural properties of tax rules expressed in natural language. The one or more embodiments combine techniques from natural language processing with those from graph algorithms to generate embeddings with this property.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving a rule comprising text;
   pre-processing the rule by replacing terms in the rule with a plurality of dummy tokens denoting a plurality of entities;
   generating, using a first machine learning model which takes the plurality of dummy tokens as input, a dependency graph comprising a rooted tree having a plurality of nodes related by a plurality of edges that are tagged according to a plurality of dependency tags;
   generating, using a second machine learning model which takes the dependency graph as input, a canonical version of the dependency graph, wherein the canonical version comprises a canonical graph having a plurality of node labels;
   sorting the plurality of node labels into a lexicographic order to form a document;
   generating, using a third machine learning model which takes the document as input, a machine readable vector that embeds the document as a sequence of numbers representative of a structure of the rule;
   comparing the machine-readable vector to a plurality of additional machine readable vectors, wherein the plurality of additional machine readable vectors corresponds to a plurality of additional rules for which a plurality of computer useable program code blocks has been generated;
   identifying a set of machine readable vectors, from the plurality of additional machine readable vectors, that match the machine readable vector within a range, wherein the set of machine readable vectors correspond to a set of rules from the plurality of additional rules; and
   displaying the set of rules to a user.

2. The method of claim 1, further comprising:
   displaying, to the user, a group of computer useable program code blocks corresponding to the set of rules.

3. The method of claim 2, further comprising:
   generating new computer useable program code configured to implement the rule in a computer, wherein generating comprises re-using at least some of the group of computer useable program code blocks for the set of rules.

4. The method of claim 1, wherein comparing comprises:
   performing a nearest neighbor retrieval between the machine readable vector and the plurality of additional machine readable vectors over a dimensional space of the machine readable vector.

5. The method of claim 1, further comprising:
   clustering the machine readable vector with the plurality of additional machine readable vectors to form a Voronoi diagram;
   calculating a plurality of distances using the Voronoi diagram, wherein each distance represents a similarity of a structure of a rule in the set to a corresponding structure of the rule comprising text;
   displaying, to the user, the computer useable program code for the set of rules together with the plurality of distances.

6. The method of claim 1, wherein the rule comprises a natural language rule, and wherein pre-processing comprises natural language processing.

7. The method of claim 1, wherein the first machine learning model comprises a natural language processing machine learning model.

8. The method of claim 1, wherein the second machine learning model comprises a Weisfeiler-Lehman (WL) algorithm, and wherein the generating the canonical version of the dependency graph comprises continuously executing the WL algorithm until all node labels converge.

9. The method of claim 1, wherein the third machine learning model comprises an unsupervised machine learning model trained to convert the document to the machine readable vector.

10. A system comprising:
    a data repository storing a rule, a plurality of dummy tokens representing a plurality of entities in the rule, a dependency graph comprising a rooted tree having a plurality of nodes related by a plurality of edges tagged according to a plurality of dependency tags, a canonical graph having a plurality of node labels, a document formed from the plurality of node labels, a machine readable vector which embeds the document as a sequence of numbers representative of a structure of the rule, and a plurality of additional machine readable vectors representative of a plurality of structures of a plurality of additional rules;
    a pre-processing engine configured to pre-process the rule by replacing terms in the rule with the plurality of dummy tokens;
    a document generator configured to sort the plurality of node labels into a lexicographic order to form the document; and
    a machine learning model execution engine configured to execute:
      a first machine learning model which receives as input the plurality of dummy tokens and outputs the dependency graph,
      a second machine learning model which receives as input the dependency graph and outputs the canonical graph, and
      a third machine learning model which receives as input the document and outputs the machine readable vector;
    a comparator configured to:
      compare the machine readable vector to the plurality of additional machine readable vectors; and
      identify a set of machine readable vectors, from the plurality of additional machine readable vectors, that match the machine readable vector within a range; and
    a display device configured to display a set of rules that correspond to the set of machine readable vectors.

11. The system of claim 10, wherein the data repository further comprises a plurality of computer useable program code blocks corresponding to the plurality of additional rules, and wherein the display device is further configured to display a group of computer useable program code blocks corresponding to the set of rules.

12. The system of claim 11, further comprising:
a code generator configured to generate new computer useable program code configured to implement the rule in a computer by re-using at least some of the group of computer useable program code blocks for the set of rules.

13. The system of claim 10 wherein:
the first machine learning model comprises a natural language processing machine learning model,
the second machine learning model comprises a Weisfeiler-Lehman (WL) algorithm, and
the third machine learning model comprises an unsupervised machine learning model trained to convert the document to the machine readable vector.

14. A non-transitory computer readable storage medium comprising computer readable program code, the computer readable program code for causing a computer system to:
receive a rule comprising text;
pre-process the rule by replacing terms in the rule with a plurality of dummy tokens denoting a plurality of entities;
generate, using a first machine learning model which takes the plurality of dummy tokens as input, a dependency graph comprising a rooted tree having a plurality of nodes related by a plurality of edges that are tagged according to a plurality of dependency tags;
generate, using a second machine learning model which takes the dependency graph as input, a canonical version of the dependency graph, wherein the canonical version comprises a canonical graph having a plurality of node labels;
sort the plurality of node labels into a lexicographic order to form a document; and
generate, using a third machine learning model which takes the document as input, a machine readable vector that embeds the document as a sequence of numbers representative of a structure of the rule;
compare the machine-readable vector to a plurality of additional machine readable vectors, wherein the plurality of additional machine readable vectors corresponds to a plurality of additional rules for which a plurality of computer useable program code blocks has been generated;
identify a set of machine readable vectors, from the plurality of additional machine readable vectors, that match the machine readable vector within a range, wherein the set of machine readable vectors correspond to a set of rules from the plurality of additional rules; and
display the set of rules to a user.

15. The non-transitory computer readable storage medium of claim 14, wherein the computer readable program code is further for causing the computer system to:
display, to the user, a group of computer useable program code blocks corresponding to the set of rules.

16. The non-transitory computer readable storage medium of claim 15, wherein the computer readable program code is further for causing the computer system to:
generate new computer useable program code configured to implement the rule in a computer, wherein generating comprises re-using at least some of the group of computer useable program code blocks for the set of rules.

17. The non-transitory computer readable storage medium of claim 14, wherein the computer readable program code is further for causing the computer system to:
perform a nearest neighbor retrieval between the machine readable vector and the plurality of additional machine readable vectors over a dimensional space of the machine readable vector.

18. The non-transitory computer readable storage medium of claim 14, wherein the computer readable program code is further for causing the computer system to:
cluster the machine readable vector with the plurality of additional machine readable vectors to form a Voronoi diagram;
calculate a plurality of distances using the Voronoi diagram, wherein each distance represents a similarity of a structure of a rule in the set to a corresponding structure of the rule comprising text;
display, to the user, the computer useable program code for the set of rules together with the plurality of distances.

19. The non-transitory computer readable storage medium of claim 14, wherein the rule comprises a natural language rule, and wherein the computer readable program code for pre-processing comprises computer readable program code for performing natural language processing.

20. The non-transitory computer readable storage medium of claim 14, wherein:
the first machine learning model comprises a natural language processing machine learning model;
the second machine learning model comprises a Weisfeiler-Lehman (WL) algorithm, and wherein the generating the canonical version of the dependency graph comprises continuously executing the WL algorithm until all node labels converge; and
the third machine learning model comprises an unsupervised machine learning model trained to convert the document to the machine readable vector.

* * * * *